US012493848B2

(12) United States Patent
Jantzi et al.

(10) Patent No.: US 12,493,848 B2
(45) Date of Patent: Dec. 9, 2025

(54) ASSET TRACKING DEVICE AND METHODS FOR LOCATION DETERMINATION

(71) Applicant: BlackBerry Limited, Waterloo (CA)

(72) Inventors: Jason Wayne Jantzi, St. Clements (CA); Mahendra Fuleshwar Prasad, Waterloo (CA); Yu Edward Gao, Waterloo (CA)

(73) Assignee: BlackBerry Limited, Ontario (CA)

( * ) Notice: Subject to any disclaimer, the term of this patent is extended or adjusted under 35 U.S.C. 154(b) by 26 days.

(21) Appl. No.: 18/175,032

(22) Filed: Feb. 27, 2023

(65) Prior Publication Data

US 2024/0289727 A1    Aug. 29, 2024

(51) Int. Cl.
*G06Q 10/0833* (2023.01)
*G01S 19/42* (2010.01)

(52) U.S. Cl.
CPC .......... *G06Q 10/0833* (2013.01); *G01S 19/42* (2013.01)

(58) Field of Classification Search
CPC ............. G06Q 10/0833; G06Q 10/083; G06Q 10/087; G06Q 10/0841; G06Q 10/0843; G06Q 10/08365; G06Q 30/0633; G06Q 30/0635; G06Q 50/40; G06Q 50/60; G01S 19/42
See application file for complete search history.

(56) References Cited

U.S. PATENT DOCUMENTS

| 10,495,764 | B2 | 12/2019 | Bastian, II et al. | |
| 2011/0102257 | A1* | 5/2011 | Spyropoulos | G01S 19/34 342/357.31 |
| 2013/0059609 | A1* | 3/2013 | Raento | H04W 4/20 455/456.6 |
| 2017/0188307 | A1* | 6/2017 | Huang | H04M 1/72457 |
| 2019/0113632 | A1 | 4/2019 | Lucrecio et al. | |
| 2019/0172008 | A1 | 6/2019 | Hage | |
| 2019/0235092 | A1 | 8/2019 | Bastian, II | |
| 2020/0279446 | A1 | 9/2020 | Hage | |
| 2021/0160327 | A1 | 5/2021 | Jantzi | |
| 2021/0264702 | A1* | 8/2021 | Neeld | G01S 19/01 |
| 2021/0408870 | A1* | 12/2021 | Ziegler | F03D 13/20 |
| 2023/0014528 | A1* | 1/2023 | Grohman | G01G 23/01 |

OTHER PUBLICATIONS

Targeted News Service, "NextNav Issues Public Comment on NIST Notice," Targeted News Service LLC, Jul. 16, 2020.*
EPO: Extended European Search Report relating to EP application No. 24157778.2, dated Jul. 30, 2024.

* cited by examiner

*Primary Examiner* — Nathan Erb
(74) *Attorney, Agent, or Firm* — Conley Rose, P.C.; J. Robert Brown, Jr.

(57) ABSTRACT

An asset tracking device and method for detecting the presence of an intermodal shipping container and responsively selecting a preferred location determination. The device may include a controller, a sensor coupled to the controller, a global navigation satellite system chip, and a cellular signal transceiver. While not detecting a container, the controller obtains location data via a global satellite system chip. While a container is detected, the sensor sends a detection signal to the controller and, responsive to the detection signal, the controller obtains location data from a cellular signal transceiver and not from the global satellite system chip.

20 Claims, 7 Drawing Sheets

ASSET TRACKING DEVICE AND METHODS FOR LOCATION DETERMINATION

FIELD

The present disclosure relates to an asset tracking device and methods and systems for location determination.

BACKGROUND

Asset tracking devices typically make use of global navigation satellite system chips in order to facilitate the gathering of location data. A global navigation satellite system chip functions by receiving and comparing signals from different satellites.

In applications such as the transportation of intermodal containers, the presence of the container may disrupt satellite signals from reaching the global navigation satellite system chip, preventing the device from determining its location.

Asset tracking devices may also utilize cellular signals by way of cellular triangulation to gather location data, but this method is less accurate than a global navigation satellite system chip.

BRIEF DESCRIPTION OF THE DRAWINGS

Reference will now be made, by way of example only, to the accompanying drawings which show example embodiments of the present application, in which.

DETAILED DESCRIPTION

Figure 1:
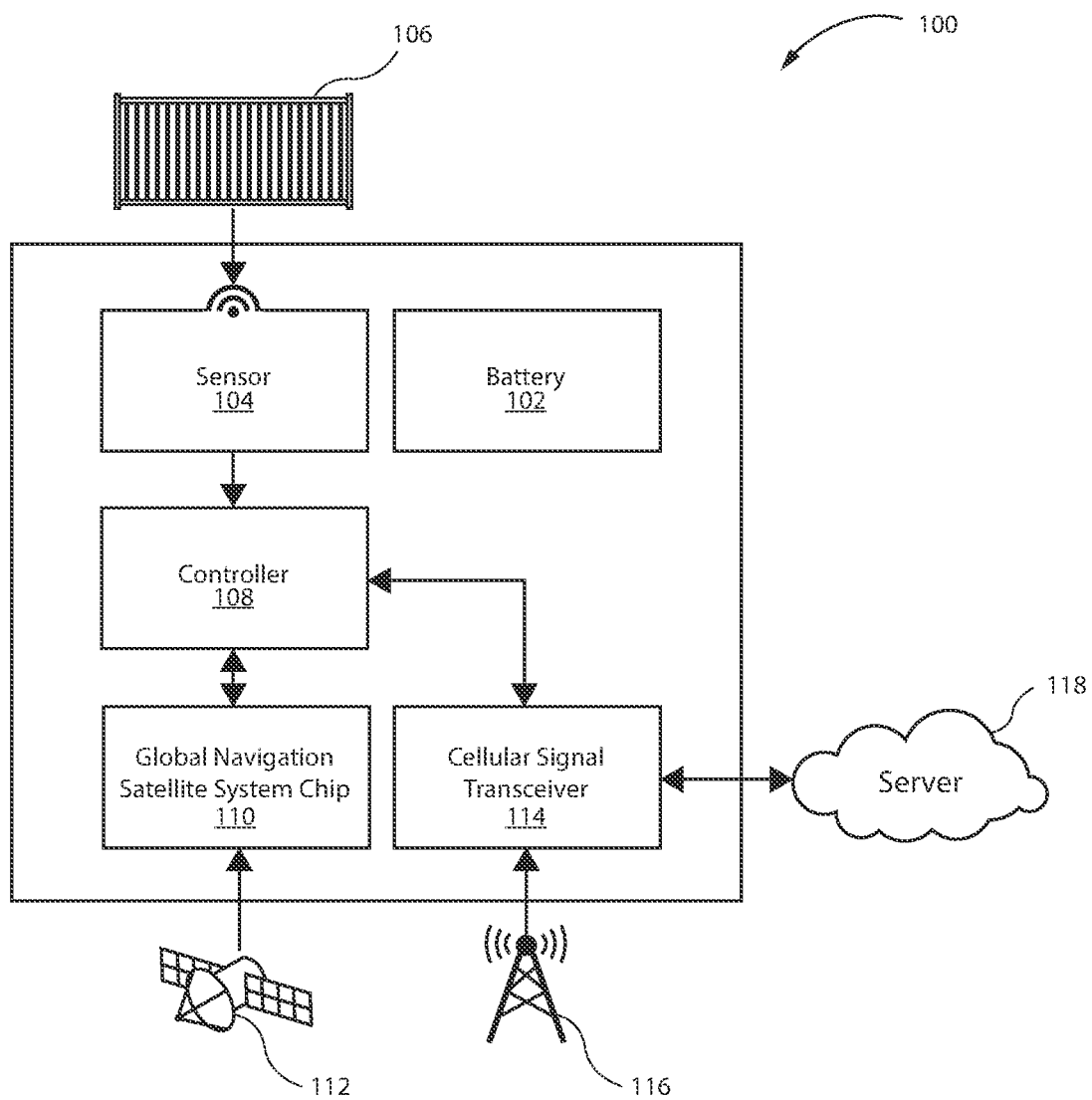
FIG. 1 is a simplified block diagram of an asset tracking device that may switch between determining location data via GNSS and cellular signals based on the presence of a container.

In one aspect, the present application describes an asset tracking device for mounting on a chassis for shipping containers. The asset tracking device may include a sensor to detect presence of a container on the chassis and to output a detection signal, a global navigation satellite system chip, a cellular signal transceiver, and a controller configured to receive the detection signal from the sensor and, responsive to the detection signal indicating the container is present, to obtain location data from the cellular signal transceiver and not from the global navigation satellite system chip, and, responsive to the detection signal indicating the container is absent, to obtain location data from the global navigation satellite system chip.

In some implementations, the sensor may detect the container is present by detecting when the container enters within a predetermined range of the sensor.

In some implementations, the sensor may further compromise any one of: a millimeter wave radar sensor, range detector, strain gauge, switch, laser, Hall effect sensor, TMR sensor, Time-of-Flight sensors, or Reid switch.

In some implementations, the asset tracking device may further comprise a motion sensor to detect movement of the asset tracking device, the controller further configured to obtain location data less frequently when movement is not detected by the motion sensor.

In some implementations, the motion sensor may comprise an accelerometer.

In some implementations, the controller may be further configured to obtain location data periodically based on a predetermined period.

In some implementations, the controller may be configured to transmit, via the cellular signal transceiver, location data to a remote server over a wireless channel.

In some implementations, the location data may be transmitted to the remote server periodically based on a predetermined period.

In some implementations, the controller may be further configured to, responsive to detecting a container by the sensor, placing the global navigation satellite system chip into a low-power or sleep mode and, responsive to detecting the absence of a container by the sensor, waking the global navigation satellite system chip from the low-power or sleep mode.

In some implementations, the controller may be further configured to periodically, based on a third predetermined period, check the detection signal and, responsive to the detection signal indicating the absence of the container, wake up the global navigation satellite system chip from the low-power or sleep mode.

In yet another aspect, the present application describes a method of selecting preferred location determination by an asset tracking device, the asset tracking device comprising a controller, a sensor coupled to the controller, a global navigation satellite system chip, and a cellular signal transceiver. The method may include detecting, by the sensor, the presence of a container and, in response, outputting a detection signal; receiving, by the controller, the detection signal from the sensor; obtaining, by the controller responsive to the detection signal indicating the absence of a container, location data from the global navigation satellite system chip and not the cellular signal transceiver; and obtaining, by the controller responsive to the detection signal indicating the presence of a container, location data from the cellular signal transceiver and not the global satellite system chip.

In some implementations, detecting the presence of a container may comprise detecting the container within a predetermined range of the sensor.

In some implementations, the sensor may comprise any one of: a millimeter wave radar sensor, range detector, strain gauge, switch, laser, Hall effect sensor, TMR sensor, Time-of-Flight sensors, or Reid switch.

In some implementations, may further include detecting, by a motion sensor, movement of the asset tracking device and wherein obtaining location data by the controller occurs less frequently while the motion sensor does not detect movement.

In some implementations, the motion sensor may comprise an accelerometer.

In some implementations, obtaining location data by the controller may be performed periodically based on a first predetermined period.

In some implementations, the method may further include transmitting, via the cellular signal transceiver, location data to a remote server over a wireless channel.

In some implementations, transmitting location data to the remote server may be performed periodically based on a second predetermined period.

In some implementations, the method may further include placing, responsive to detecting a container by the sensor, the global navigation satellite system chip into a low-power or sleep mode; and waking, responsive to detecting the absence of a container by the sensor, the global navigation satellite system chip from the low-power or sleep mode.

In some implementations, the method may further include checking, by the controller, periodically based on a third predetermined period whether the detection signal is still active and, responsive to the detection signal indicating the absence of a container, waking the global navigation satellite system chip from the low-power or sleep mode.

As noted above, asset tracking devices often make use of a global navigation satellite system (GNSS) chip in order to determine location data. The GNSS chip receives signals from a plurality of satellites, comparing the difference in time it takes to receive the signals from each satellite and utilizing this information to determine the location of the chip based on the relative positions of the satellites. Although very accurate in determining location data, one weakness of utilizing GNSS chips in tracking devices is that, should the device's view of the sky be disrupted in such a way that satellite signals cannot easily reach the device, the GNSS chip may fail to reliably determine its location. A GNSS chip may also fail to reliably determine its location in other situations, such as while experiencing multipath fading such as in an urban canyon, or when experiencing jamming or any other intentional blocking of the GNSS chip from receiving satellite signals.

An alternative to GNSS tracking is to use received cellular signals from local cellular towers in a process known as cellular triangulation. Cellular triangulation functions similar to GNSS, utilizing terrestrial cellular towers to triangulate a position rather than satellites. As such, cellular triangulation does not require a clear view of the sky, however in situations where a clear view of the sky is available, it tends to be less accurate than GNSS tracking.

In the field of the transportation of intermodal containers, asset tracking devices may be placed on a chassis meant to transport the container in question. In such cases, the presence of the container, often made of metal, often blocks the GNSS chip from receiving satellite signals. Further, asset tracking devices are typically powered by batteries and deployed for extended periods of time. As such, power conservation may be advantageous in ensuring that an asset tracking device may continue to function for an extended period of time without maintenance.

In accordance with one aspect of the present application, an asset tracking device is described that may switch between determining location data via a GNSS chip and a cellular signal transceiver based on the presence or absence of an intermodal container. The device may include a sensor which detects the presence or absence of an intermodal container, determining location data via cellular signals when a container is present and via GNSS when a container is absent, therefore always utilizing an tracking solution that reduces overall power consumption. By utilizing such as solution, the asset tracking device may advantageously conserve battery power by refraining from powering the GNSS chip in situations when conducting a search for satellite signals would be fruitless due to the presence of an intermodal container and instead immediately move on to obtaining location data through cellular triangulation via the cellular signal transceiver.

Reference is now made to FIG. 1, which shows in block diagram form a simplified example of asset tracking device 100 in accordance with the present application. The device 100 may include one or more batteries 102 to power the device. Battery 102 may be rechargeable or replaceable, and device 100 may further include battery charging circuitry (not shown) to receive charge from an external power source.

The asset tracking device 100 further contains at least a sensor 104, a controller 108, a GNSS chip 110, and a cellular signal transceiver 114. The sensor 104 detects the presence or absence of a container 106. The sensor 104 may include one or more sensors, and may include a millimeter wave radar sensor, a range detectors, strain gauges, switches, lasers, Hall effect sensors, TMR, Time-of-Flight sensors, Reid switch, or any other sensor that may be capable of detecting the presence of a container. If the presence of the container 106 is detected, the sensor 104 outputs a detection signal to the controller 108. Depending on the nature of the sensor 104, it may output a detection signal if the container 106 is not present. In some cases, the sensor 104 outputs a signal in both circumstances and the signal, which may be a binary signal, indicates whether the container 106 is present or not.

The controller 108 may, in some embodiments, be a microprocessor that may be coupled to memory (not pictured). The controller 108 is configured to obtain location data from the GNSS chip 110 and the cellular signal transceiver 114. When the detection signal from the sensor 104 indicates the presence of the container 106, the controller 108 obtains location data from the cellular signal transceiver 114 and not the GNSS chip 110. Moreover, the controller 108 does not power up the GNSS chip 110. When the detection signal from the sensor 104 indicates that an intermodal container is not present, then the controller 108 obtains powers up the GNSS chip 110 and obtains location data from the GNSS chip 110. Under this condition, the controller 108 would not obtain location data from the cellular signal transceiver 114 unless the attempt to obtain location data from the GNSS chip 110 fails for some reason. In some further embodiments, the controller 108 may be configured to obtain location data from the cellular signal transceiver 114 and not the GNSS chip 110 when the container 106 is not detected by the sensor 104, and may do so when satellite signals are weak, such as when the tracking device 100 is experiencing multipath fading, when satellite signals are jammed or intentionally blocked, or any other situation where obtaining location data from the cellular signal transceiver 114 may be more accurate than obtaining location data from the GNSS chip 110.

In some embodiments, the controller 108 may be configured to refrain from powering the GNSS chip 110 in response to receiving the detection signal from sensor 104. The GNSS chip 110 may be disconnected from the battery 102 through a switch (not shown) or any other means of disconnection. In some cases, the GNSS chip 110 may be configured default to a low power or sleep mode in the absence of an enable signal, in which case the controller 108 refrains from powering the GNSS chip 110 by not sending it the enable signal at a time when it would have otherwise sent the enable signal in order to power up the GNSS chip 110 and obtain location data. Refraining from powering the GNSS chip 110 may be advantageous in terms of extending the life of the battery 102 due to unnecessarily utilizing power to attempt to detect satellite systems when the presence of the container 106 would make detection less likely. In some implementations, the GNSS chip 110 may have a low-power or sleep mode in which it normally operates and the controller 108 may be configured to wake up the GNSS chip 110 using a wake-up input signal. In the situation where the controller 108 determines, from the detection signal, that the container 106 is present, it does not send the wake-up input signal to the GNSS chip 110.

In further embodiments, the controller 108 may periodically check the detection signal sensor from the sensor 104. Responsive to the detection signal indicating the absence of an intermodal container, the controller 108 may enable the GNSS chip 110, cease obtaining location data from the cellular signal transceiver 114, and resume obtaining location data from the GNSS chip 110.

The GNSS chip 110 receives location data from a plurality of satellites 112. This location data may consist of the time taken to receive signals from the satellites 112 and may then be sent to the controller 108.

The cellular signal transceiver 114 receives location data from a plurality of cellular signal towers 116. This location data may include cellular tower identifiers, mobile network identifiers, mobile operator identifiers, timestamps and other data obtainable from the cellular signal towers 116 and may then be sent to the controller 108.

In some embodiments, the controller 108 may be configured to transmit the location data obtained from the GNSS chip 110 and/or the cellular signal transceiver 114 to a remote server 118 over a wireless channel. The wireless channel may be a data channel established over a cellular network via the cellular signal transceiver 114. The remote server may then determine the geographic location of the asset tracking device 100 based on the location data transmitted. Additionally or alternatively, the controller 108 may be configured to determine, using the location data obtained through the GNSS chip 110 and/or the cellular signal transceiver 114, the geographic location of the asset tracking device 100 which may be transmitted to the remote server 118 via the cellular signal transceiver 114. In some embodiments, the cellular signal transceiver 114 may consist of a separate cellular signal receiver and cellular signal transmitter (not pictured), the cellular signal receiver obtaining location data from the cellular towers 116 and the cellular signal transmitter sending location data to the remote server 118.

Figure 2:
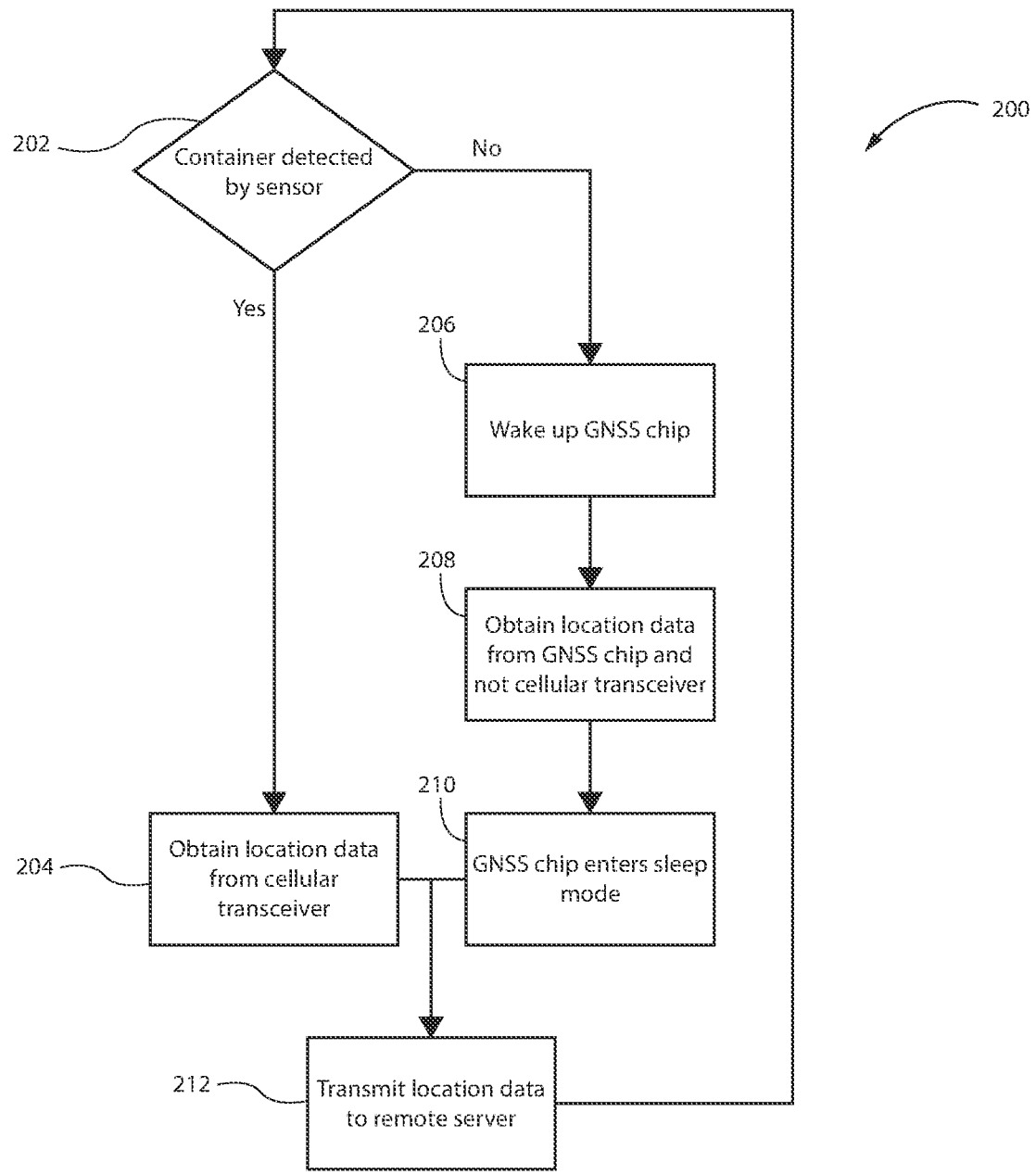
FIG. 2. is a flowchart showing one simplified example method of detecting the presence or absence of a container and obtaining location data via cellular signals or GNSS respectively.

Reference is now made to FIG. 2 showing one simplified example method 200 of detecting the presence or absence of a container and obtaining location data via cellular signals or GNSS respectively. The method 200 may be implemented by way of the asset tracking device 100 (FIG. 1).

In operation 202, the asset tracking device detects the presence or absence of a container by a sensor, the sensor outputting a detection signal to the controller. If a container was detected in operation 202, then, in operation 204 location data is obtained by the controller via the cellular transceiver.

If a container was not detected in operation 202, then in operation 206 the GNSS chip is awoken from its low-power or sleep mode. The GNSS chip may be awoken by receiving a wake-up signal from the controller, reconnecting to the battery, or by any other method that would enable the GNSS chip to awake from the low-power or sleep mode as described above. In operation 208, location data is obtained by the controller via the GNSS chip, as detailed above, and not the cellular transceiver. In operation 210, the GNSS chip is placed back into low-power or sleep mode as described above.

In operation 212, the location data obtained in operations 204 and/or 208 are transmitted to a remote server over a wireless channel via the cellular transceiver.

Figure 3A:
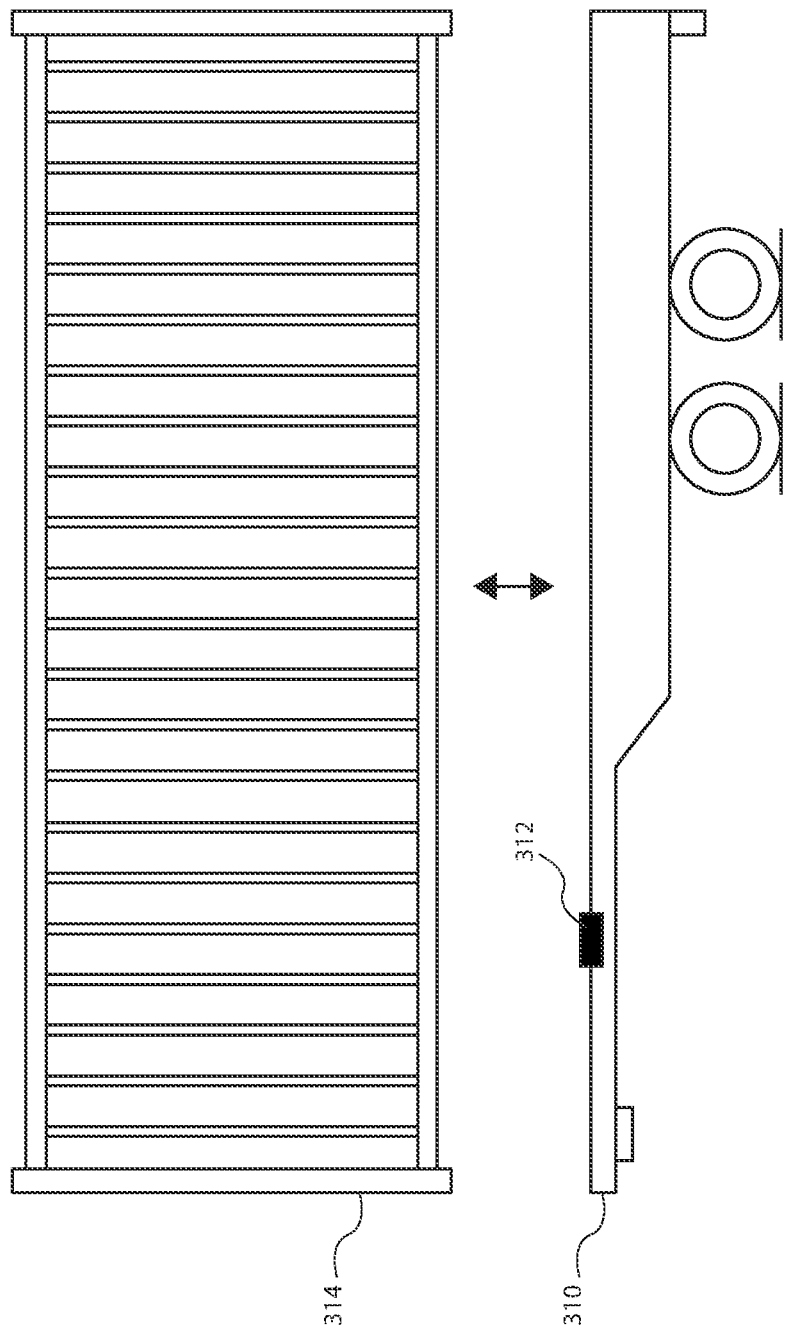
FIG. 3A is a side elevational view of a trailer chassis adapted to receive shipping containers, the figure showing an example placement of the asset tracking device.
Figure 3B:
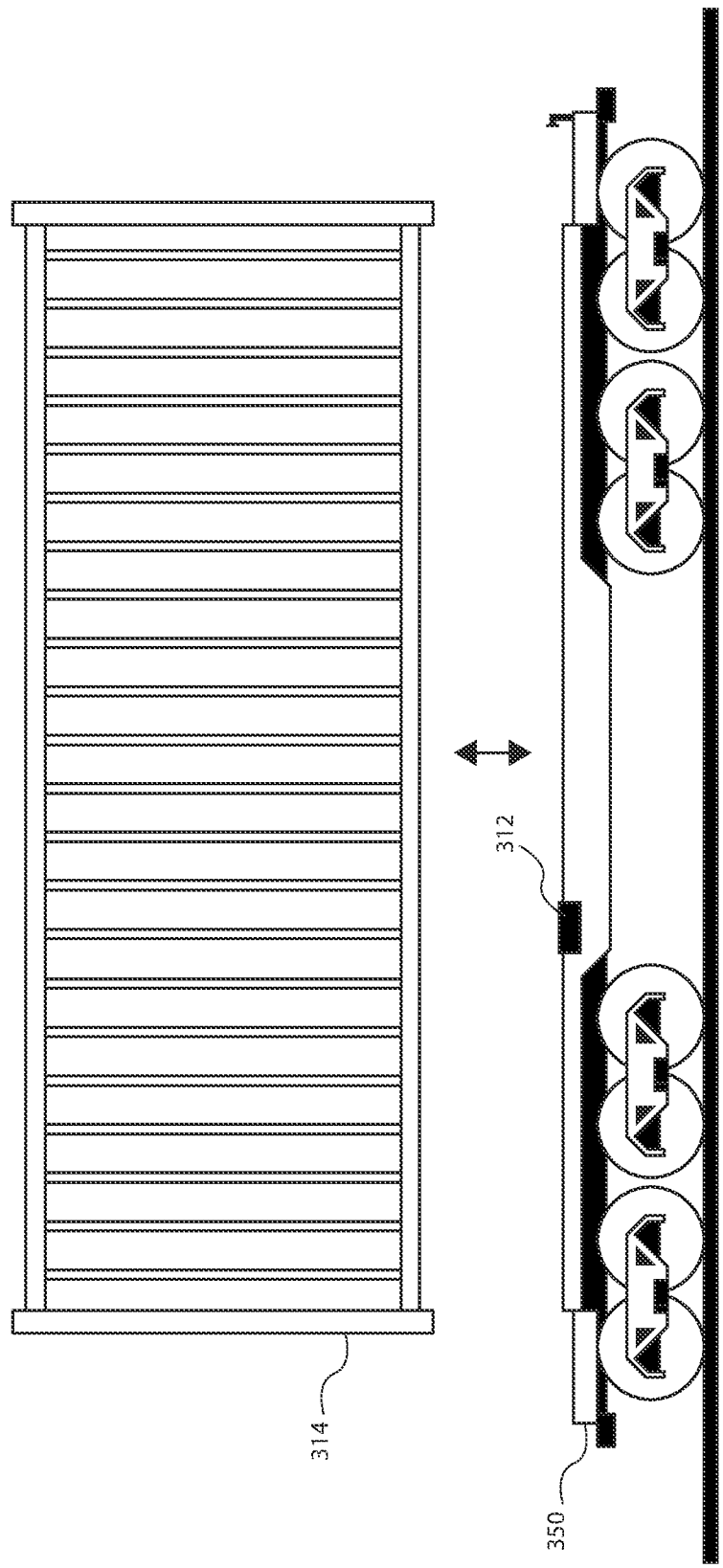
FIG. 3B is a side elevational view of a train chassis adapted to receive shipping containers, the figure showing an example placement of the asset tracking device.

Reference is now made to FIG. 3, which contains two example embodiments FIG. 3A and FIG. 3B.

In the embodiment of FIG. 3A, example truck trailer chassis 310 is shown. In one embodiment, the asset tracking device 312 may be mounted on the bed of the trailer chassis 310.

In other cases, it may be beneficial to have a different position for the asset tracking device 312, which in some embodiments may be analogous to the asset tracking device 100 (FIG. 1). Further, in some embodiments wherein the asset tracking device 312 constitutes a plurality of parts or units, those parts or units may be positioned separately on the trailer chassis 310.

A further example, shown in FIG. 3B, provides an example train chassis 350 which may have an asset tracking device 312 mounted thereon.

Further, in the embodiments of FIGS. 3A and 3B, the intermodal container 314 may be mounted to the trailer chassis 310 or the train chassis 350 respectively. In embodiments where the asset tracking device 312 is mounted beneath the intermodal container 314, as detailed above, the intermodal container 314 may block satellite signals from reaching the asset tracking device 312, making it advantageous to switch from attempting to obtain location data via GNSS to only attempting to receive location data via cellular signals.

Figure 4:
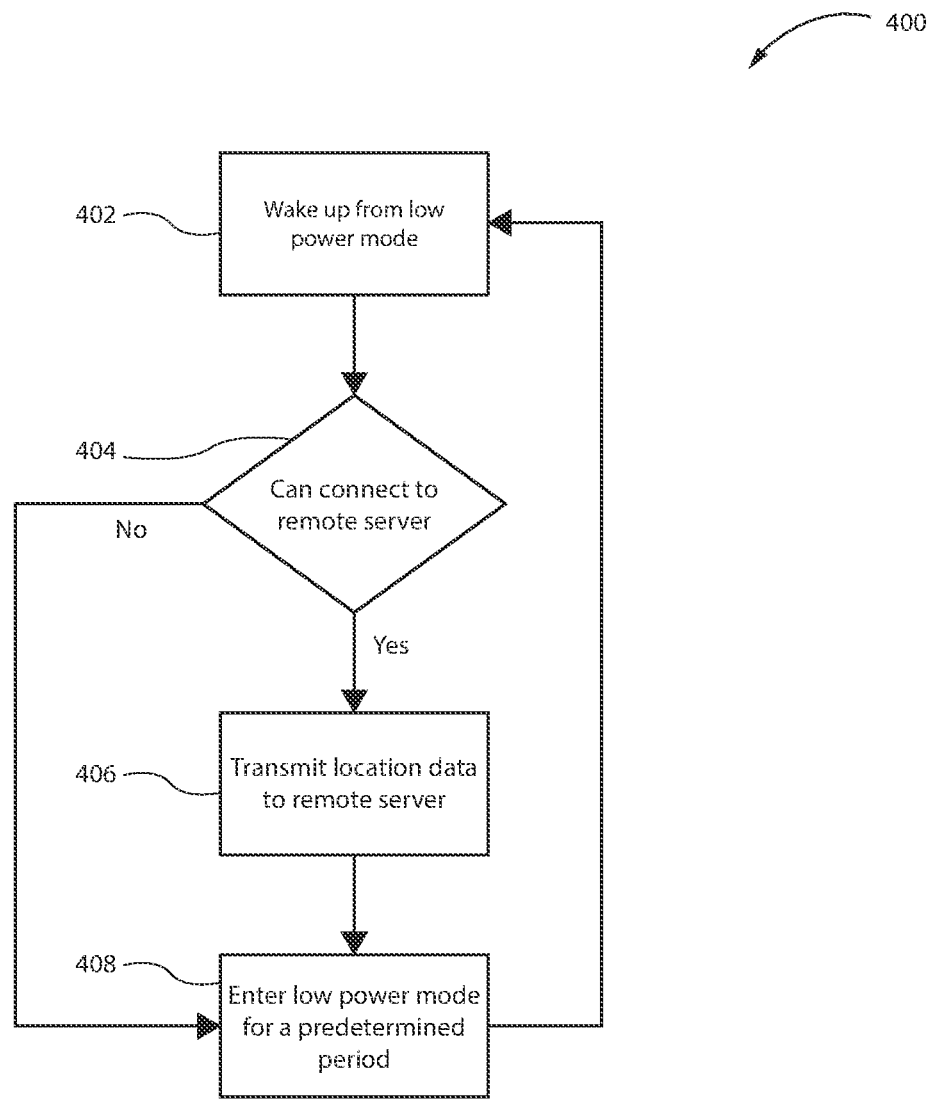
FIG. 4 is a flowchart showing one simplified example method of periodically transmitting location data to a remote server.

Reference is now made to FIG. 4 showing one simplified example method 400 of periodically transmitting location data to a remote server. The example method 400 may be implemented by way of the asset tracking device 100 (FIG. 1).

In operation 402, the controller wakes up from a low power mode where the controller draws reduced power from the battery.

In operation 404, the controller may attempt to establish a cellular data connection to a remote server via the cellular signal transceiver.

If a cellular data connection to the remote server was established in operation 404, then in operation 406, location data is transmitted by the controller, via the cellular signal transceiver, to the remote server over a wireless channel. The location data may include location data obtained by the GNSS chip and/or the cellular signal transceiver and may include all location data obtained since the controller last connected to the remote server.

After transmitting the location data to the remote server in operation 406 or after failing to connect to the remote server in operation 404 then, in operation 408, the asset tracking device re-enters the low power mode for a predetermined period of time. In some embodiments, the controller may be configured to receive instructions from the remote server, those instructions configuring the controller to change the period of time between the transmissions of location data to the remote server.

Figure 5:
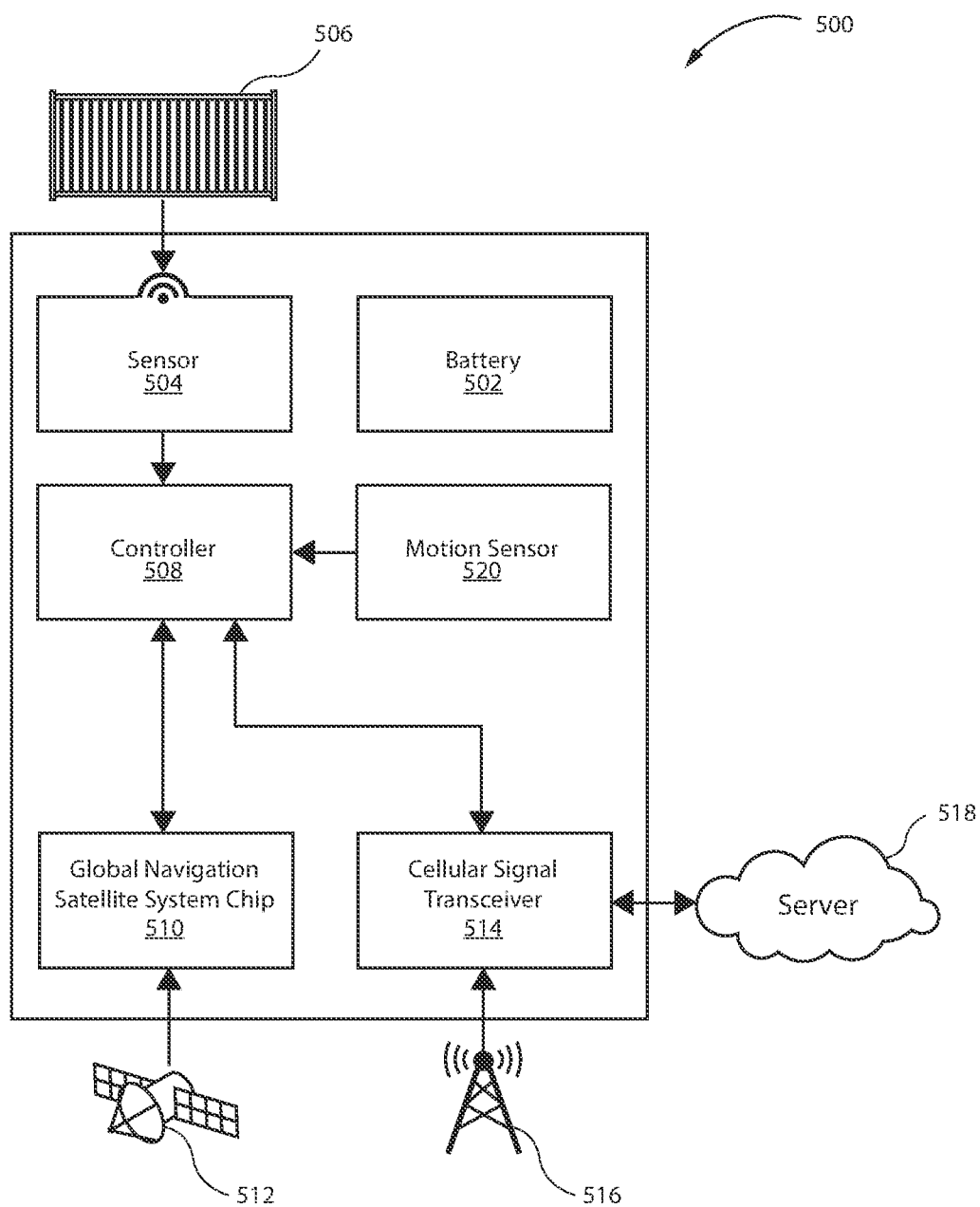
FIG. 5 is a simplified block diagram of the asset tracking device having a motion sensor.

Reference is now made to FIG. 5 showing in block diagram form a simplified example of asset tracking device 500 which may include a battery 502 which powers the asset tracking device 500, a sensor 504 which detects the presence or absence of an intermodal container 506 and, responsive to the detection by the sensor 504 of the intermodal container 506, transmits a detection signal to controller 508. If the detection signal is not present, the controller 508 may obtain location data via the global navigation satellite system chip 510 communicating with a plurality of satellites 512, while if the detection signal is present the controller may obtain location data from a plurality of cellular towers 516.

In some implementations, the asset tracking device 500 may obtain location data periodically in order to prolong the life of the battery 502. This period may be predetermined, and may be stored in memory (not pictured) coupled to the controller 508. In some further implementations the period may be changed or updated by receiving instructions by the controller 508 from the remote server 518 or any other device via the cellular signal transceiver 514. The period may be the same or distinct from the period described in FIG. 4. When not obtaining or transmitting location data, the controller 508 may enter a low power mode in which it draws reduced power from battery 502.

The asset tracking device may include a motion sensor 520. The motion sensor 520 may detect the movement of the asset tracking device 500. The movement may be detected by detecting slight changes in acceleration or vibrations, indicating that the asset tracking device may be in transit. The motion sensor 520 may output a motion signal to the controller 508. The controller 508 may be configured to determine from the motion signal whether the device 500 is in motion. If the device 500 is in motion, the controller 508 may be configured to obtain and transmit location data on a more frequent basis, i.e. with a relatively short periodicity such as every 5 or 10 minutes. Otherwise, if the controller 508 determines that the device is not in motion then it may not obtain or transmit location data in order to conserve the life of battery 502 when the asset tracking device 500 has not moved. When controller 508 determines that the device 500 is stationary, it may collect and report location data less frequently or not at all. For instance, it may collect and report location data only every hour, six hours, twelve hours, etc. The motion sensor 520 may be an accelerometer, an inertial sensor, or any other sensor that may detect movement.

In some further implementations, the controller 508 may be configured to wake up from the low-power or sleep mode periodically, determine whether movement is detected from the motion sensor 520, returning to the low-power or sleep mode if no motion is detected or proceed to obtain or transmit location data as described above if motion is detected. Alternatively or additionally, the controller 508 may store, in memory, if it received the motion signal from the motion sensor 520 and, when the controller 508 would obtain or transmit location data, if the signal was not received indicating there had been no movement of the asset tracking device 500 and no need to utilize unnecessary battery power to gather or transmit unneeded location data.

Figure 6:
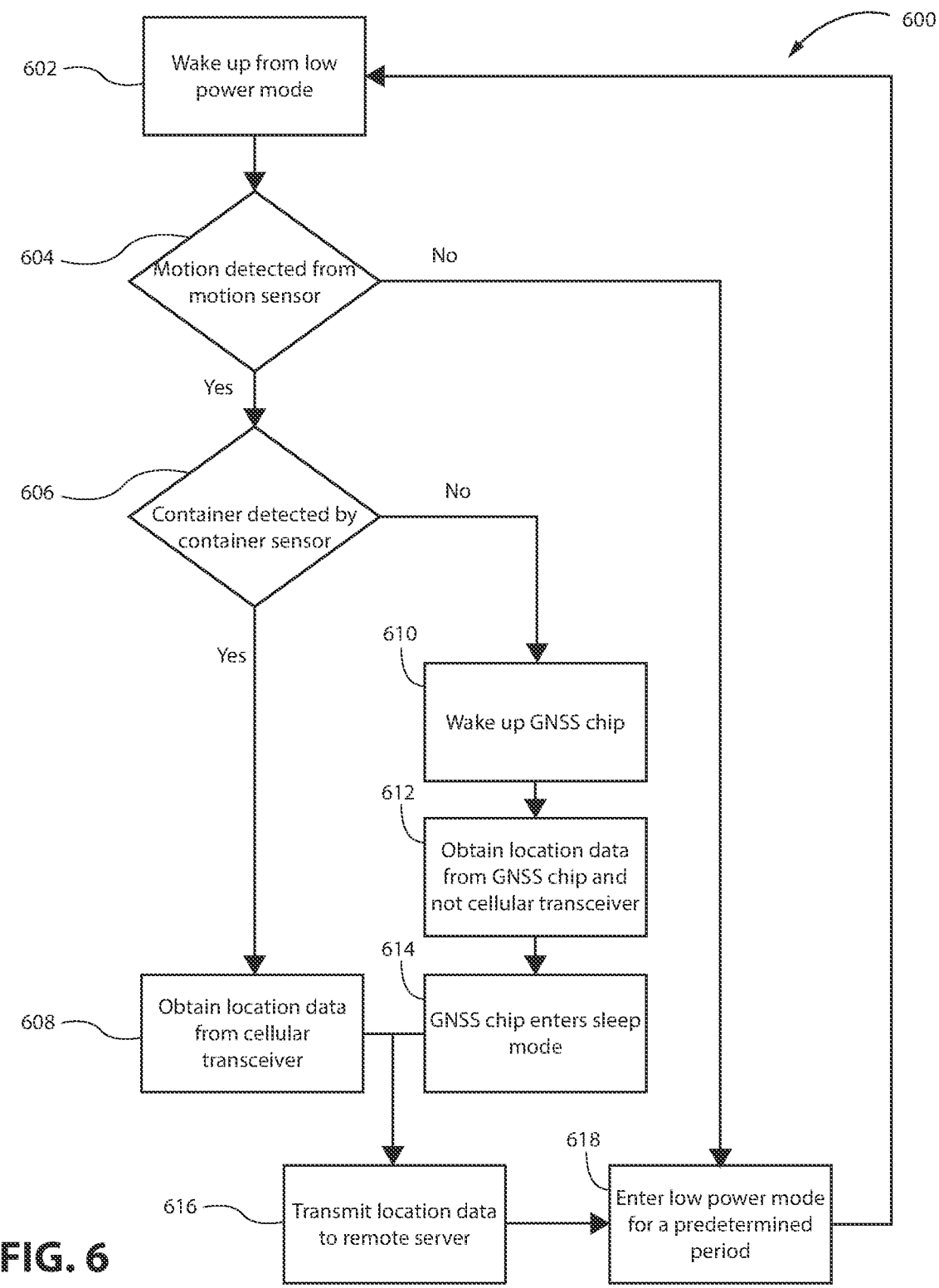
FIG. 6 is a flowchart showing one simplified example method of detecting motion of the asset tracking device and transmitting location data from either the GNSS chip or the cellular signal transceiver to a remote server periodically.

Reference is now made to FIG. 6 showing one simplified example method 600 of detecting motion of the asset tracking device and transmitting location data from either the GNSS chip or the cellular signal transceiver to a remote server periodically. The example method 600 may be implemented by way of the asset tracking device 500 (FIG. 5).

In operation 602, the asset tracking device wakes up from a low power mode, in which it draws reduced power from the battery. In operation 604, the motion sensor detects motion in the present and/or motion that occurred since the asset tracking device entered low power mode.

If motion was detected in operation 604, then in operation 606 the container-detecting sensor detects whether there is an intermodal container present on the chassis and outputs the detection signal to the controller.

If an intermodal container was detected in operation 606, then in operation 608 the controller may obtain location data from a plurality of cellular towers by way of the cellular signal transceiver.

If an intermodal container was not detected in operation 608, then in operation 610 the GNSS chip may be awoken from a low-power or sleep mode. In operation 612, the controller may obtain location data from a plurality of satellites by way of the GNSS chip. In operation 614, the GNSS chip may be placed back into the low-power or sleep mode.

Upon completion of operation 608 or operation 614, in operation 616 the location data obtained by the controller may be transmitted to a remote server over a wireless channel via the cellular signal transceiver.

In operation 618, having completed operation 616 or if the motion sensor did not detect motion in operation 604, the controller may re-enter the low power mode for a predetermined period of time.

The above discussed embodiments are considered to be illustrative and not restrictive. Certain adaptations and modifications of the described embodiments may be made. All such modification, permutations and combinations are intended to fall within the scope of the present disclosure.

The invention claimed is:

1. An asset tracking device for mounting on a chassis for shipping containers, comprising:
   a sensor configured to detect whether a container is present on the chassis, and output a detection signal indicating whether the container is present on the chassis;
   a global navigation satellite system chip;
   a cellular signal transceiver; and
   a controller configured to
      receive the detection signal from the sensor,
      in response to determining that the detection signal from the sensor indicates that the container is present on the chassis, refrain from powering the global navigation satellite system chip and obtain location data from the cellular signal transceiver and not from the global navigation satellite system chip, and
      in response to determining that the detection signal from the sensor indicates that the container is absent on the chassis, wake up the global navigation satellite system chip and obtain location data from the global navigation satellite system chip.

2. The asset tracking device of claim 1, wherein the sensor is further configured to detect whether the container is present by detecting the container entering detection range of the sensor.

3. The asset tracking device of claim 2, wherein the sensor comprises a millimeter wave radar sensor, range detector, strain gauge, switch, laser, Hall effect sensor, TMR sensor, Time-of-Flight sensors, or Reid switch.

4. The asset tracking device of claim 1, further comprising an accelerometer configured to detect movement of the asset tracking device, wherein the controller is further configured to obtain location data less frequently when movement is not detected by the accelerometer than when movement is detected by the accelerometer.

5. The asset tracking device of claim 1, wherein the detection signal is a binary signal.

6. The asset tracking device of claim 1, wherein the controller is further configured to obtain location data periodically based on a first period.

7. The asset tracking device of claim 1, wherein the controller is further configured to transmit, via the cellular signal transceiver, location data to a remote server over a wireless channel.

8. The asset tracking device of claim 7, wherein the location data is transmitted to the remote server periodically based on a second period.

9. The asset tracking device of claim 8, wherein the controller is further configured to refrain from powering the global navigation satellite system chip by placing the global navigation satellite system chip into a low-power or sleep mode.

10. The asset tracking device of claim 9, wherein the controller is further configured to periodically check, based on a third period, the detection signal.

11. A method of selecting preferred location determination by an asset tracking device, the asset tracking device comprising a controller, a sensor coupled to the controller, a global navigation satellite system chip, and a cellular signal transceiver, the method comprising:
   detecting, whether a container is present on a chassis, and outputting a detection signal indicating whether the container is present on the chassis;
   receiving, by the controller, the detection signal from the sensor;
   refraining from powering the global navigation satellite system chip and obtaining location data from the cellular signal transceiver, in response to determining that the detection signal from the sensor indicates that a container is present on the chassis;
   waking up, by the controller, the global navigation satellite system chip and obtaining location data from the global navigation satellite system chip and not the cellular signal transceiver, in response to determining that the detection signal from the sensor indicates that the container is absent on the chassis.

12. The method of claim 11, wherein the detecting whether the container is present on the chassis comprises detecting whether the container is within a range of the sensor.

13. The method of claim 12, wherein the sensor comprises a millimeter wave radar sensor, range detector, strain gauge, switch, laser, Hall effect sensor, TMR sensor, Time-of-Flight sensors, or Reid switch.

14. The method of claim 11, further comprising detecting, by an accelerometer, movement of the asset tracking device, wherein the obtaining of location data by the controller occurs less frequently when the accelerometer does not detect movement than when the accelerometer detects movement.

15. The method of claim 14, wherein the detection signal is a binary signal.

16. The method of claim 11, wherein the obtaining of location data by the controller is performed periodically based on a first period.

17. The method of claim 11, wherein the method further comprises transmitting, via the cellular signal transceiver, location data to a remote server over a wireless channel.

18. The method of claim 17, wherein the transmitting of location data to the remote server is performed periodically based on a second predetermined period.

19. The method of claim 18, wherein the refraining from powering the global navigation satellite system chip comprises placing the global navigation satellite system chip into a low-power or sleep mode.

20. The method of claim 19, further comprising periodically checking, by the controller, the detection signal based on a third period.

* * * * *